DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 4, 1971

886 O.G. 4

T886,003

GAUGE CONTROL OF FOAM STRUCTURES

Leon Edward Wolinski, Buffalo, N.Y., assignor to E. I. du Pont de Nemours and Company, Wilmington, Del.

Filed Sept. 26, 1969, Ser. No. 861,477

Int. Cl. B29d *27/00;* B32b *5/18;* C08f *7/04*

U.S. Cl. 264—51

No Drawing. 12 Pages Specification

Process for the treatment of thermoplastic closed cell foam structures by:

(a) Heating the structure to at least the second order transition temperature of the foam and below the temperature at which the foam undergoes cellular collapse, (b) Compressing the foam structure to a thickness less than the nominal thickness of the foam structure and greater than the thickness determined according to the formula:

$$T=AB/C$$

wherein T is the desired minimum thickness, A is the density of the foam prior to treatment, B is initial nominal thickness of the foam, and C is the density of the unfoamed polymer, and (c) Expanding the foam structure substantially free from restraint until the temperature of the foam structure is below the second order transition temperature.